(12) United States Patent
Wileczek

(10) Patent No.: US 7,383,216 B1
(45) Date of Patent: Jun. 3, 2008

(54) TRUST COMPARISON PROCESS

(75) Inventor: Ralph C. Wileczek, Sewell, NJ (US)

(73) Assignee: Wilmington Trust Corporation, Wilmington, DE (US)

( * ) Notice: Subject to any disclaimer, the term of this patent is extended or adjusted under 35 U.S.C. 154(b) by 1609 days.

(21) Appl. No.: 09/887,935

(22) Filed: Jun. 22, 2001

(51) Int. Cl.
*G06Q 40/00* (2006.01)

(52) U.S. Cl. .......................................... 705/36; 705/37

(58) Field of Classification Search .................. 705/35, 705/36 R, 36–37
See application file for complete search history.

(56) References Cited

U.S. PATENT DOCUMENTS

| | | | | |
|---|---|---|---|---|
| 5,884,287 | A * | 3/1999 | Edesess | 705/36 R |
| 6,021,397 | A * | 2/2000 | Jones et al. | 705/36 R |
| 6,061,662 | A * | 5/2000 | Makivic | 705/36 R |
| 6,085,174 | A * | 7/2000 | Edelman | 705/36 R |
| 6,415,267 | B1 * | 7/2002 | Hagan | 705/36 R |
| 6,430,542 | B1 * | 8/2002 | Moran | 705/36 R |
| 6,601,044 | B1 * | 7/2003 | Wallman | 705/36 R |
| 2002/0013754 | A1 * | 1/2002 | Frank et al. | 705/36 |
| 2002/0138386 | A1 * | 9/2002 | Maggioncalda et al. | 705/36 |

* cited by examiner

*Primary Examiner*—James Kramer
*Assistant Examiner*—Thu Thao Havan
(74) *Attorney, Agent, or Firm*—Michael B. Fein; Cozen O'Connor

(57) ABSTRACT

The system and method of the present invention comprises a process for comparing income, principle and expenses of an existing trust and a proposed trust. The process comprises selecting a period for which the comparison is desired, selecting a constant rate of income and appreciation for an asset class of the existing trust. Further, the present invention comprises selecting a proposed trust, selecting each asset value, asset class and allocation of assets in the proposed trust, selecting a payer of the proposed trust's capital gains, and selecting a basis for comparison among possible outcomes of the steps involving the proposed trust to generate the comparison.

6 Claims, No Drawings

TRUST COMPARISON PROCESS

BACKGROUND OF THE INVENTION

Traditional income trusts have placed the trustees, who have a fiduciary duty of impartiality towards all beneficiaries, in the middle of the inherent conflict between the income needs of the income beneficiaries and the growth needs of the remainder beneficiaries. Historically, the only devices available to affect income distributions have been asset allocation, which determines almost all of the investment total return, or, if granted, discretionary powers in a trustee to invade principal.

The potential problem of asset allocation as the mechanism for establishing an adequate payout to income beneficiaries is that a portfolio that emphasized income over a long period of time, is likely to under perform a portfolio that uses a long-term investment horizon to focus on growth. This is because growth portfolios focus on equities while income portfolios tend to hold a higher concentration of fixed income securities. The longer the time horizon, the more likely equities will outperform other forms of investments. To resolve this issue, some income trusts have granted trustees discretion to allow payouts from interest and principal to meet desired income levels.

While empowering a trustee to determine which assets to liquidate and how much of an income distribution to make can effectively balance the needs of the income beneficiaries and the remainder beneficiaries, there are also potential pitfalls with this strategy. Income or remainder beneficiaries could object to a payout that they feel is arbitrary and to their detriment. In addition, exercise of a trustee's discretionary power can subject trust assets to reinvestment and market risk because of the lack of a pre-established liquidation strategy.

Recent legislation, such as the Delaware and Missouri Total Return Unitrust (TRU) statutes, permits conversion of an existing irrevocable trust to a Total Return Unitrust. This allows a trustee to invest for total return while eliminating the conflicts of interest between the current income needs of the life beneficiary and the future distribution needs of the remainder beneficiary. However, a continuing need exists for a means for comparing the performance of trusts to provide a basis for selecting the right vehicle to serve the needs of the beneficiaries.

SUMMARY OF THE INVENTION

The present invention provides a process for efficiently comparing performance under an existing trust with a proposed trust.

Specifically, the instant invention provides a process for comparing income, principle and expenses of an existing trust and a proposed trust, each trust having assets, the process comprising:

a. evaluating and classifying each asset in the existing trust, and determining the allocation of assets;
b. determining the type of the existing trust;
c. selecting a period for which the comparison is desired;
d. determining the tax rates of the income beneficiaries;
e. determining or identifying the current trust fees;
f. selecting a constant rate of income and appreciation for each asset class;
g. selecting among constant rates, real rates and real rates in fabricated order for purposes of comparison;
h. selecting a proposed trust;
i. selecting each asset value, asset class and allocation of assets in the proposed trust;
j. selecting proposed trust fees;
k. selecting a payer of the proposed trust's capital gains;
l. selecting payout rate of the proposed trust;
m. selecting an averaging period for the proposed trust;
n. calculating gains or losses of each asset;
o. determining the total current year payout as a percent;
p. applying the payout % to the prior year-end balance to determine what the current year payout should be;
q. selecting a basis for comparison among possible outcomes of steps (g) and (l), holding other factors constant; and
r. generating a visual comparison.

The resulting visual comparison can then be used to select between the existing and proposed trusts, and, if indicated, to convert to the proposed trust.

DETAILED DESCRIPTION OF THE INVENTION

The process of the present invention involves the several steps indicated above. In many cases, the sequence of the steps is not critical. For example, the selection, determination or identification of many of the factors involved in the process, such as current trust fees, payout rates, and asset values can be carried out in different orders, as long as each of the factors is available for the final comparison. In addition, while the present process will typically be used to compare an existing trust and a proposed trust, the present process can be simply used to compare two different trusts, in which case the terms "existing trust" and "proposed trust" are understood to mean first and second trusts, respectively.

A first step in the process, identified as (a) above, involves evaluating and classifying each asset in the existing trust, and determining the allocation of assets. The classification of assets is typically among those classifications recognized in the industry, including, for example, tax-exempt cash, tax-exempt bonds such as long-term municipal bonds, taxable cash, taxable bonds such as long-term government bonds, and stocks.

The step in the process identified as (b) above involves determining the type of the existing trust. Such trusts include, for example, Grandfathered GST or Marital Trusts. If the Trust to be converted is a Grandfathered GST or Marital Trust, then income will be compared to the total payout and selected if it is greater than a chosen payout between 3%-5%. This comparison is done on a year by year basis throughout the planning horizon and any year that the income for a Grandfathered GST or Marital Trust exceeds the payout as determined as a percentage of the total trust value or average of the smoothed values, it will be selected in place of the unitrust payout percentage. Any amount of income or appreciation not paid out is redistributed to the appropriate asset class based on the asset allocation percentage of that asset class at the end of the prior year.

The step in the process identified as (c) above involves selecting a period for which the comparison is desired, or a planning horizon. This period can vary widely, but is typically from 1 to 34 years.

The step in the process identified as (d) above involves determining the tax rates of the income beneficiaries.

The step in the process identified as (e) above involves determining or identifying the current trust fees.

The step in the process identified as (f) above involves selecting a constant rate of income and appreciation for each asset class.

The step in the process identified as (g) above involves selecting among constant rates, real rates and real rates in a fabricated sequence. In the last possibility, for example, real rates from multiple actual years could be used, but, for purposes of comparison, these rates for actual years can be arranged in an artificial sequence, to simulate a set of conditions for purposes of the comparison replicating the performance in those years.

The step in the process identified as (h) above involves selecting a proposed trust.

The step in the process identified as (i) above involves selecting each asset value, asset class and allocation of assets in the proposed trust.

The step in the process identified as (j) above involves selecting proposed trust fees or fee rates.

The step in the process identified as (k) above involves selecting a payer of the proposed trust's capital gains, generally between the trust and the income beneficiary.

The step in the process identified as (l) above involves selecting a payout rate of the proposed trust. Once the payout figure has been determined per the above calculations, it is broken out into three components: income, gains and principal. This break out is determined mathematically by adding all of the income and comparing the income to the calculated payout. If income exceeds or equals the payout and the trust is not a Grandfathered GST or Marital trust, then the excess income is reinvested to the asset classes that generated income in their proper asset allocation. If the trust is a Grandfathered GST or Marital trust, then the entire income is treated as an income payout. If the income calculated is less than the payout calculated, it is subtracted from the calculated payout and the resulting balance will be compared to the accumulated gains that have been collected by asset type in the TRU calculation. If the accumulated gain equals or exceeds the resulting difference, then the excess balance will be reinvested into the appropriate asset type based on the proper asset weighting of appreciable assets at the end of the prior year and the calculated payout will be transferred to the TRU or other proposed trust for which the comparison is being generated. If, after the prior two comparisons, there is still a balance of the payout that exceeds income plus gains, then the resulting difference will be attributed to principal and removed from all asset types in the proper asset weighting of each asset class as determined at the end of the prior year.

The step in the process identified as (m) above involves selecting an averaging period for the proposed trust. This averaging, or "smoothing" period can be zero or, if a smoothing period is desired, can typically be 2, 3, 4, 5, 6, 7, 8, 9, or 10 years. The payout can be automatically calculated on the average of the current year trust balance and 1, 2, 3, 4, 5, 6, 7, 8, or 9 prior years. If the trust has been in existence less than the smoothing period selected, a graduated smoothing can be utilized until the trust has been in existence for the smoothing period selected.

The step in the process identified as (n) above involves calculating the gains or losses of each asset. The assets are evaluated to estimate the likely return that will be generated. Calculations for representative assets are shown below. Other methods of calculation can be substituted for better fit to the asset type, as will be recognized by those skilled in the art.

Cash is US 30 Day T-Bill

Characteristics: Total Return (TR), Inflation Adjusted Total Return (Infl-Adj TR).

Class: Money Market.

Time Period January 1965-present.

Scope:

U.S. 30 Day TBill Infl-Adj TR is computed as the geometric difference between U.S. 30 Day TBill TR and U.S. Inflation, or:

$$U.S.\ 30\ Day\ TBill\ Infl\text{-}Adj\ TR = (1+U.S.\ 30\ Day\ TBill\ TR)/(1+U.S.\ Inflation)-1$$

Source(s) and Methodology:

For the U.S. Treasury Bill index, data from The Wall Street Journal can be used for 1977-Present; the CRSP U.S. Government Bond File is the source from 1926 to 1976. Each month a one-bill portfolio containing the shortest-term bill having not less than one month to maturity is constructed. The bill's original term to maturity is not relevant. To measure holding period returns for the one-bill portfolio, the bill is priced as of the last trading day of the previous month-end and as of the last trading day of the current month.

The price of the bill (P) at each time (t) is given as:

$$P(t)=[1-rd/360]$$

where, r=decimal yield (the average of the bid and ask quotes) on the bill at time t; and, d=number of days to maturity as of time t.

The total return on the bill is the month-end price divided by the previous month-end price, minus one.

2.1999

Stock is S&P 500 Index

Characteristics: Total Return (TR), Capital Appreciation (Cap App), Income Return (Inc Ret), Inflation-Adjusted Total Return (Infl-Adj TR).

Class: Equity.

Time Period January 1965-present, for exceptions, see Scope.

Data Frequency Monthly.

Currencies: Data series are denominated in U.S. dollars, unless otherwise specified in the series name.

S&P 500 Infl-Adj TR is computed as the geometric difference between S&P 500 TR and U.S. Inflation, or:

$$S\&P\ 500\ Infl\text{-}Adj\ TR=(1+S\&P\ 500TR)/(1+U.S.\ Inflation)-1$$

Source(s) and Methodology:

The S&P 500® Index is a readily available, carefully constructed, market-value-weighted benchmark of common stock performance. Market-value-weighted means that the weight of each stock in the index, for a given month, is proportionate to its market capitalization (price times the number of shares outstanding) at the beginning of that month. Currently, the S&P® Composite includes 500 of the largest stocks (in terms of stock market value) in the United States; prior to March 1957 it consisted of 90 of the largest stocks.

S&P 500 Data Methodology 11.1995

Tax-Exempt Bond is Intermediate-Term Municipal Bonds

Characteristics: Total Return (TR), Capital Appreciation (Cap App), Income Return (Inc Ret), Market Value (Mkt Val).

Class: Fixed Income.

US Capital Markets (USC), U.S. Investment Benchmarks (UIB), Primary Benchmarks (PBM).

Time Period Total Return, Capital Appreciation, and Income Return: 1977-present.

Data Frequency Annual.

Sources & Methodology:

RETURNS:

1985-Present:

Ibbotson Associates calculates the total return by adding together an income return and a capital appreciation. The income return is equal to the December average municipal yield (average of Aaa, Aa, A, Baa grades). The capital appreciation is computed using the December yield as the year end yield and as the beginning-of-the-following year yield. From these yields, a price is calculated and used to determine the capital appreciation. Yields are taken from the Moody's Bond Record.

Taxable Bonds is US Long-Term Government

Characteristics: Total Return (TR), Capital Appreciation (Cap App), Income Return (Inc Ret), Yield (Yld), Inflation Adjusted Total Return (Infl-Adj TR).

Class: Fixed Income.

Time Period: 1926-present, for exceptions see Scope.

Data Frequency Monthly.

Currencies: Data series are denominated in U.S. dollars, unless otherwise specified in the series name.

U.S. LT Gvt Infl-Adj TR is computed as the geometric difference between U.S. LT Gvt TR and U.S. Inflation, or:

$$\text{U.S. LT Gvt Infl-Adj TR} = (1+\text{U.S. LT Gvt TR})/(1+\text{U.S. Inflation}) - 1$$

Source(s) & Methodology:

TOTAL RETURN: The total returns from 1977-present are constructed with data from The Wall Street Journal. The data from 1926-1976 are obtained from the Government Bond File at the Center for Research in Security Prices (CRSP) at the University of Chicago Graduate School of Business. To the greatest extent possible, a one bond portfolio with a term of approximately 20 years and a reasonably current coupon—whose returns did not reflect potential tax benefits, impaired negotiability, or special redemption or call privileges—was used each year. Where "flower" bonds (tenderable to the Treasury at par in payment of estate taxes) had to be used, the term of the bond was assumed to be a simple average of the maturity and the first call dates minus the current date. The bond was "held" for the calendar year and returns were computed.

Total returns for 1977-present are calculated as the change in the flat or "and-interest" price. The flat price is the average of the bid and ask prices plus the accrued coupon. The accrued coupon is equal to zero on the day a coupon is paid, and increases over time until the next coupon payment according to the formula:

$$A = fC$$

where,

A=accrued coupon;

C=semiannual coupon rate; and f=number of days since last coupon payment/number of days from last coupon payment to next coupon payment.

INCOME RETURN: For 1977-present, the income return is calculated as the change in the flat price plus any coupon actually paid from one period to the next, holding yield constant over the period. As in the total return series, the exact number of days comprising the period is used. For 1926-1976, the income return for a given month is calculated as the total return minus the capital appreciation return as described below.

CAPITAL APPRECIATION (Return in excess of yield): For 1977-present, capital appreciation is taken as the total return minus the income return for each month. For 1926-1976, the capital appreciation return is obtained from the CRSP Government Bond File. A bond's capital appreciation is defined as the total return minus the income return; that is, the return in excess of yield. This definition omits the capital gain or loss that comes from the movement of a bond's price towards par (in the absence of interest rate change) as it matures. Capital appreciation, as defined here, captures changes in bond prices caused by changes in the interest rate.

YIELDS: The yield on the long-term government bond series is defined as the internal rate of return that equates the bond's flat price with the stream of cash flows (coupons and principal) promised to the bondholder. The yields reported for 1977-present were calculated from The Wall Street Journal. The yields for 1926-1976 were obtained from the CRSP Government Bond File.

2.1996

Tax-Exempt Cash is the Liper Tax-Exempt Money Market Fund—Total Appreciation and Income Since Dec. 31, 1997 (% Total Return)

When the dollar values of the assets are determined, separate calculations can be automatically carried out for each of the trusts being compared, typically an existing trust and a TRU. For TRU calculations, gains or losses will be accumulated separately from income for TRU payouts.

The step in the process identified as (o) involves determining the total current year payout as a percent. For a TRU, the gains and losses are combined with the income and added to the total trust's prior year end balance to determine the total current year payout as a percent (a value between 3-5 as entered in the input area).

The step in the process identified as (p) involves applying the payout % to the prior year-end balance to determine what the current year payout should be. The selected payout percentage will be applied to the prior year-end balance to determine what the current year payout should be unless the trust is a Grandfathered GST or Marital Trust or if smoothing has been elected and given a value of 2, 3, 4, 5, 6, 7, 8, 9, or 10.

If the trust to be converted is a Grandfathered GST or Marital Trust, then income will be compared to the total payout and selected if it is greater than the chosen payout between 3%-5%. This comparison is done on a year by year basis throughout the planning horizon and any year that the income for a Grandfathered GST or Marital Trust exceeds the payout as determined as a percentage of the total trust value or average of the Smoothed values, it will be selected in place of the unitrust payout percentage.

Any amount of income or appreciation not paid out is redistributed to the appropriate asset class based on the asset allocation percentage of that asset class at the end of the prior year.

If a smoothing period of 2, 3, 4, 5, 6, 7, 8, 9, or 10 years is used, the payout will be calculated on the average of the current year trust balance and 1, 2, 3, 4, 5, 6, 7, 8, or 9 prior years. If the trust has been in existence less than the smoothing period selected, a graduated smoothing should be used until the trust has been in existence for the smoothing period selected.

The fees for a TRU are subtracted from each funded asset class in the appropriate asset class weighting as determined as a percent of the total assets. The income and gains taxes are subtracted from the pre-tax distribution that is to be paid out to the income beneficiary unless the trust beneficiary has been selected to pay the taxes. In this case the gains tax is subtracted from each funded asset class in the appropriate asset class weighting as determined as a percent of the total assets.

The process next involves totaling all of the separate asset classes and transferring the balance to the beginning of the succeeding year to provide a beginning balance of the next year. This process is repeated as needed for each year to the end of the planning horizon. All of the income and appreciation or depreciation calculated in the calculation area are also totaled for evaluation of the TRU. The above calculations are repeated until the planning horizon exceeds the number of calculation passes. If planning horizon exceeds the number of planning lines calculated then one last pass is made and no more payouts or accumulated TRU balances will be determined. Each of these calculations can be transferred to a summary sheet for the final comparison of the trusts.

In each of the above calculations of gain or loss and income, the rate of return used in the calculations will be the assumed rates, real rates or real rates in a fabricated order.

Once the payout, total income and appreciation or depreciation, and resulting trust year end balance has been determined, and preferably transferred to a summary sheet, several calculations are carried out. The calculations are as follows:

The fees are taken as a percent of the current TRU balance.

The gains and income taxes are calculated based on the components that were segregated to income, gain, and principal above. If the gains are to be paid by the trust, a flat rate of 20% will be used in gains distributed and it will be redistributed to the TRU; otherwise, it will be deducted from the calculated payout to the income beneficiary. All income taxes will be deducted from the calculated payout to the income beneficiary.

The Portfolio Returns, Pre-Tax Distribution, Taxes Paid by trust, Fees Paid By Trust, Taxes Paid By Beneficiary, and Net Income To Beneficiary will all be totaled to the end of the planning horizon for display in a tabular report form.

The TRU balance will simply be the accumulated balance at the end of the planning horizon.

In calculation of the income for the existing trust, appreciation (gains) or depreciation (losses) will be accumulated separately but only income will be distributed as a payout and all appreciation or depreciation will be redistributed to the appropriate asset class based on the asset allocation percentage of that asset class at the end of the year.

The fees are calculated on the Current Trust from the percentage previously determined. The balance is subtracted from each funded asset class in the appropriate asset class weighting as determined as a percent of the total assets.

The income taxes are calculated on the existing trust and the balance is subtracted from the pre-tax distribution that is to be paid out to the income beneficiary. The gains tax is determined as the product of capital gains paid by trust (% of total assets), and the total current trust balance at prior year end.

All of the separate asset classes are totaled and transferred to the beginning of the succeeding year. This data is conveniently transferred to a summary sheet to provide a beginning balance of the next year and to aid in the generation of a visual comparison. All of the income and appreciation or depreciation calculated in these calculations are also totaled and can be transferred to a summary sheet. The above calculations are repeated again until the planning horizon exceeds the number of calculation passes. If the planning horizon exceeds the number of planning lines calculated then one last pass is made and no more payouts or accumulated Current Trust balances will be determined. The rate of return used in the calculations will be the assumed rates, real rates or real rates in a fabricated order.

Once the payout, total income and appreciation or depreciation, and resulting trust year-end balance has been determined for the current trust, several calculations are applied to these results. The fees are taken as a percent of the current income trust balance and applied to the existing trust. The portfolio returns, pre-tax distribution, taxes paid by the trust, fees paid by the trust, taxes paid by the beneficiary, and net income to the beneficiary will all be totaled to the end of the planning horizon and preferably displayed in a tabular report form to aid in the generation of a visual comparison. The Current Income Trust balance will simply be the accumulated balance at the end of the planning horizon.

As will be evident to those skilled in the art, a wide variety of macros can be set up to aid in the comparison of different time paths, payout percentages and tax treatments. For example, macros can be set up to compare the performance of the trusts depending on whether the beneficiary or the trust pays taxes.

The step in the process identified as (q) above involves selecting a basis for comparison among possible outcomes of steps (g) and (l), holding other factors constant.

The step in the process identified as (r) above involves generating a visual comparison. This can vary with the desires of the individuals making the comparison, and can, for example, be graphical or tabular.

The process of the instant invention permits the generation of information for ready comparison of existing and proposed trusts. The various steps, the assembly of data, and the generation of the comparisons, within the guidelines specified above, can be done with the aid of a computer, using appropriate programming to carry out the required steps. The process preferably further comprises selecting one of the trusts being compared, and, if the existing trust is not the one selected, converting to the proposed trust.

I claim:

1. A process for assisting trust beneficiaries and trustees in deciding whether to convert an irrevocable trust to a proposed total return unitrust comprising:
   a. evaluating and classifying each asset in the existing irrevocable trust, and determining the allocation of assets;
   b. selecting a period for which the comparison is desired;
   c. determining the tax rates of the income beneficiaries;
   d. determining or identifying the current trust fees;
   e. selecting a constant rate of income and appreciation for each asset class;
   f. selecting among constant rates, real rates and real rates in fabricated order for purposes of comparison;

g. selecting each asset value, asset class and allocation of assets in the proposed trust;
h. selecting proposed trust fees;
i. selecting a payer of the proposed trust's capital gains;
j. selecting payout rate of the proposed trust;
k. selecting an averaging period for the proposed trust;
l. calculating gains or losses of each asset;
m. determining the total current year payout as a percent;
n. applying the payout % to the prior year-end balance to determine what the current year payout should be;
o. selecting a basis for comparison among possible outcomes of steps (g) and (l), holding other factors constant; and
p. generating a visual comparison.

2. A process of claim 1 wherein the irate selected in step (g) is arbitrary.

3. A process of claim 1 wherein the rate selected in step (g) is historical.

4. A process of claim 1 wherein the rates selected in step (g) are historical, but structured in an arbitrary pattern.

5. A process of claim 1 further comprising selecting, on the basis of the visual comparison, between the existing and proposed trusts.

6. A process of claim 5 wherein the proposed trust is selected and the process further comprises converting to the proposed trust.

* * * * *